(12) United States Patent
Kato et al.

(10) Patent No.: US 10,471,865 B2
(45) Date of Patent: Nov. 12, 2019

(54) VEHICLE SEAT

(71) Applicant: TOYOTA BOSHOKU KABUSHIKI KAISHA, Aichi-ken (JP)

(72) Inventors: Yasuhiro Kato, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/934,209

(22) Filed: Mar. 23, 2018

(65) Prior Publication Data

US 2018/0281642 A1 Oct. 4, 2018

(30) Foreign Application Priority Data

Mar. 29, 2017 (JP) ................. 2017-064815

(51) Int. Cl.
| | |
|---|---|
| *B60N 2/56* | (2006.01) |
| *B60N 2/58* | (2006.01) |
| *B60H 1/00* | (2006.01) |
| *B60N 2/64* | (2006.01) |
| *B60N 2/68* | (2006.01) |
| *B60N 2/90* | (2018.01) |

(52) U.S. Cl.
CPC ........... *B60N 2/58* (2013.01); *B60H 1/00564* (2013.01); *B60N 2/5621* (2013.01); *B60N 2/5657* (2013.01); *B60N 2/643* (2013.01); *B60N 2/68* (2013.01); *B60N 2/986* (2018.02); *B60H 2001/00721* (2013.01)

(58) Field of Classification Search
CPC ........ B60N 2/5635; B60N 2/68; B60N 2/682; B60N 2/58; B60N 2/5621; B60N 2/5657; B60N 2/643; B60N 2/986

USPC .................................................. 297/180.14
See application file for complete search history.

(56) References Cited

U.S. PATENT DOCUMENTS

| | | | | | |
|---|---|---|---|---|---|
| 5,102,189 | A | * | 4/1992 | Saito ................... | B60N 2/5635 297/180.14 X |
| 6,644,735 | B2 | * | 11/2003 | Bargheer ........... | B60H 1/00285 297/180.13 |
| 6,746,076 | B2 | * | 6/2004 | Bogisch ................ | B60J 7/223 297/180.14 |
| 7,673,935 | B2 | * | 3/2010 | Nishide ............... | B60N 2/5635 297/180.14 |
| 8,646,836 | B2 | * | 2/2014 | Oota ................... | B60N 2/5657 297/180.12 |
| 2002/0057005 | A1 | * | 5/2002 | Bargheer ................ | B60J 7/223 297/180.13 |

(Continued)

FOREIGN PATENT DOCUMENTS

| | | | | | |
|---|---|---|---|---|---|
| JP | 2010142274 | A | * | 7/2010 | ........... B60N 2/5635 |
| JP | 2016-11071 | | | 1/2016 | |

*Primary Examiner* — Rodney B White
(74) *Attorney, Agent, or Firm* — Greenblum & Bernstein, P.L.C.

(57) ABSTRACT

A vehicle seat including: a seat cover configuring a design surface of a seat peripheral surface portion; a seat pad covered by the seat cover and configured to elastically support a load from a seated person; an air conditioning duct protruding from the seat peripheral surface portion; an insertion hole penetrating the seat cover and the seat pad; and a connection member attached to a seat internal structure which is provided at one side of the insertion hole opposite to another side of the insertion hole from which the duct is inserted into the insertion hole, wherein the duct is attached to the seat internal structure in a state of being inserted into the insertion hole and connected with the connection member.

4 Claims, 6 Drawing Sheets

(56) References Cited

U.S. PATENT DOCUMENTS

| | | | | |
|---|---|---|---|---|
| 2002/0057006 A1* | 5/2002 | Bargheer | ........... | B60H 1/00285 |
| | | | | 297/180.14 |
| 2006/0267383 A1* | 11/2006 | Bargheer | ............. | B60N 2/5635 |
| | | | | 297/180.14 |
| 2007/0107440 A1* | 5/2007 | Ito | ........................ | B60N 2/5635 |
| | | | | 62/3.2 |
| 2008/0129090 A1* | 6/2008 | Zeyen | ................... | B60N 2/5635 |
| | | | | 297/180.14 |
| 2008/0136221 A1* | 6/2008 | Hartmann | .......... | B60H 1/00821 |
| | | | | 297/180.14 |
| 2008/0191520 A1* | 8/2008 | Hartmann | ............ | B60N 2/5635 |
| | | | | 297/180.12 |
| 2008/0203781 A1* | 8/2008 | Bargheer | ............... | B60N 2/879 |
| | | | | 297/180.13 |
| 2008/0290703 A1* | 11/2008 | Bargheer | ............. | B60N 2/5621 |
| | | | | 297/180.14 |
| 2008/0315634 A1* | 12/2008 | Hartmann | ............ | B60N 2/5635 |
| | | | | 297/180.14 |
| 2009/0008970 A1* | 1/2009 | Flory | ................... | B60N 2/5621 |
| | | | | 297/180.14 |
| 2009/0134677 A1* | 5/2009 | Maly | .................... | B60N 2/5635 |
| | | | | 297/180.14 |
| 2011/0133525 A1* | 6/2011 | Oota | .................... | B60N 2/5635 |
| | | | | 297/180.14 |
| 2012/0256450 A1* | 10/2012 | Sahashi | ................ | B60N 2/5635 |
| | | | | 297/180.14 |
| 2013/0165033 A1* | 6/2013 | Fitzpatrick | ......... | B60H 1/00285 |
| | | | | 454/120 |
| 2014/0179212 A1* | 6/2014 | Space | .................... | B60N 2/565 |
| | | | | 454/76 |
| 2016/0347218 A1* | 12/2016 | Akaike | ................ | B60N 2/5628 |
| 2016/0347219 A1* | 12/2016 | Akaike | ................ | B60N 2/5628 |

\* cited by examiner

VEHICLE SEAT

CROSS-REFERENCE TO RELATED APPLICATIONS

This application claims priority from Japanese Patent Application No. 2017-064815 filed on Mar. 29, 2017, the entire contents of which are incorporated herein by reference.

TECHNICAL FIELD

The disclosure relates to a vehicle seat, and specifically to a vehicle seat including a seat cover configuring a design surface of a seat peripheral surface portion, a seat pad covered by the seat cover and configured to elastically support a load from a seated person, and an air conditioning duct protruding from the seat peripheral surface portion.

BACKGROUND

In a vehicle seat, there has been known a configuration in which air outlets for blowing air towards a seated person are provided to seat sides (see JP-A-2016-11071). Each of the air outlets is formed at a front end of a duct arranged to penetrate the seat side from a seat back side, so that air sent out from an air blower on the seat back side is blown towards a side of the seated person.

In the related art, a duct has a long arrangement route in which the duct detours around a periphery of a seat shape, and thus the structure becomes large because, for example, a separate member for protecting the duct is necessary.

SUMMARY

The disclosure has been made to solve the above problem, and the problem to be solved by the disclosure is to arrange an air conditioning duct compactly in a vehicle seat.

According to an aspect of the disclosure, there is provided a vehicle seat including: a seat cover configuring a design surface of a seat peripheral surface portion; a seat pad covered by the seat cover and configured to elastically support a load from a seated person; an air conditioning duct protruding from the seat peripheral surface portion; an insertion hole penetrating the seat cover and the seat pad; and a connection member attached to a seat internal structure which is provided at one side of the insertion hole opposite to another side of the insertion hole from which the duct is inserted into the insertion hole, wherein the duct is attached to the seat internal structure in a state of being inserted into the insertion hole and connected with the connection member.

DETAILED DESCRIPTION

Figure 1:
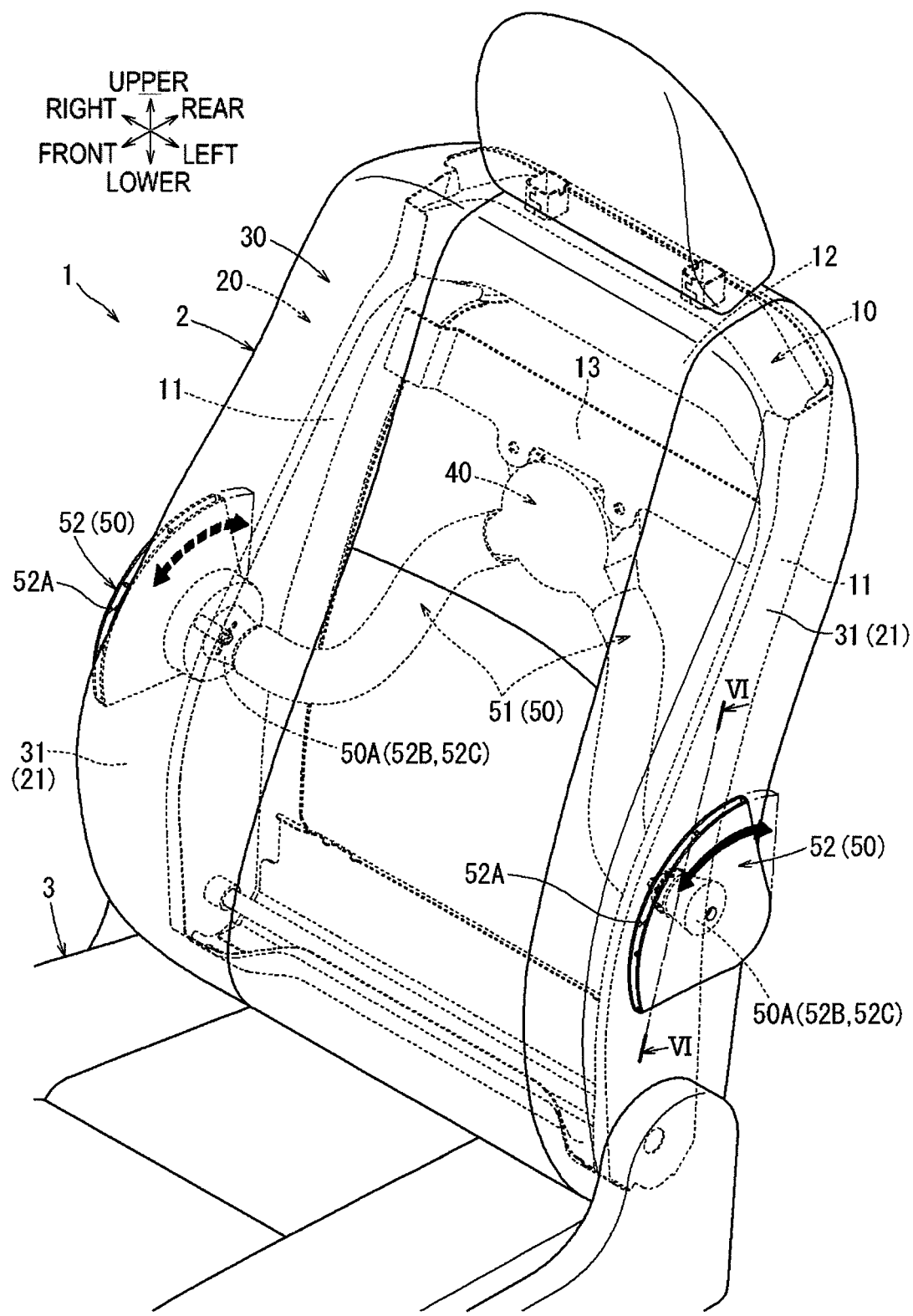
FIG. 1 is a perspective view showing a schematic configuration of a vehicle seat according to a first embodiment.

Hereinafter, modes for carrying out the disclosure will be described with reference to the drawings.

First Embodiment

Schematic Configuration of Seat 1

First, a configuration of a seat 1 (vehicle seat) according to a first embodiment will be described with reference to FIGS. 1 to 6. Incidentally, in the following description, directions such as front, rear, upper, lower, left, and right directions refer to each direction shown in the drawings. Also, a "seat width direction" refers to a left-right direction of the seat 1, a "seat height direction" refers to an upper-lower direction of the seat 1, and a "seat front-rear direction" refers to a front-rear direction of the seat 1.

As shown in FIG. 1, the seat 1 of the embodiment is configured as a right seat of an automobile, and includes a seat back 2 serving as a backrest portion of a seated person, and a seat cushion 3 serving as a seating portion thereof. Lower end portions on left and right sides of the seat back 2 are coupled to rear end portions on left and right sides of the seat cushion 3 via a recliner (not shown) in a state where a backrest angle can be adjusted. The seat cushion 3 is coupled to a floor of the vehicle via a pair of left and right slide rails therebetween (not shown) in a state where a position in a seat front-rear direction thereof can be adjusted.

Also, air conditioning ducts 50 through which air can be blown towards a body of the seated person are provided on the left and right side portions of the seat back 2 in a state where air outlets 52A thereof are exposed to the outside. The ducts 50 are connected with an air conditioning apparatus 40 provided inside the seat back 2, and are configured such that air sent out from the air outlets 52A by the air conditioning apparatus 40 can be blown towards a front side of the body of the seated person. Also, each duct 50 includes a rotation mechanism 50A through which a direction of the air outlet 52A which is opened to a front side thereof can be changed in a seat height direction by an operation in which a part of the duct exposed to the outside of the seat back 2 is gripped by a user such as a seated person and rotated in the seat height direction.

Figure 2:
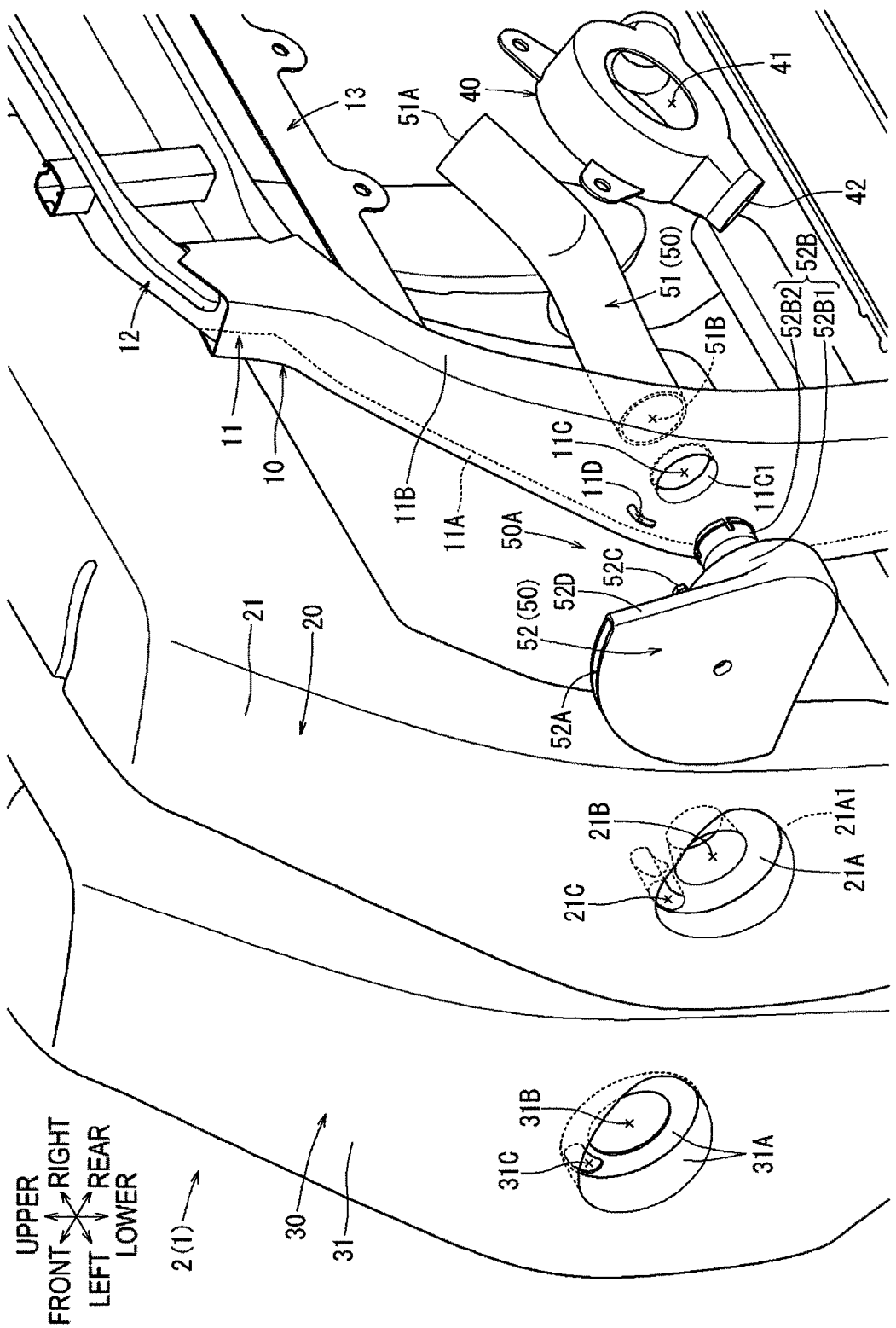
FIG. 2 is an exploded perspective view showing a state where a duct is detached from a seat frame.
Figure 3:
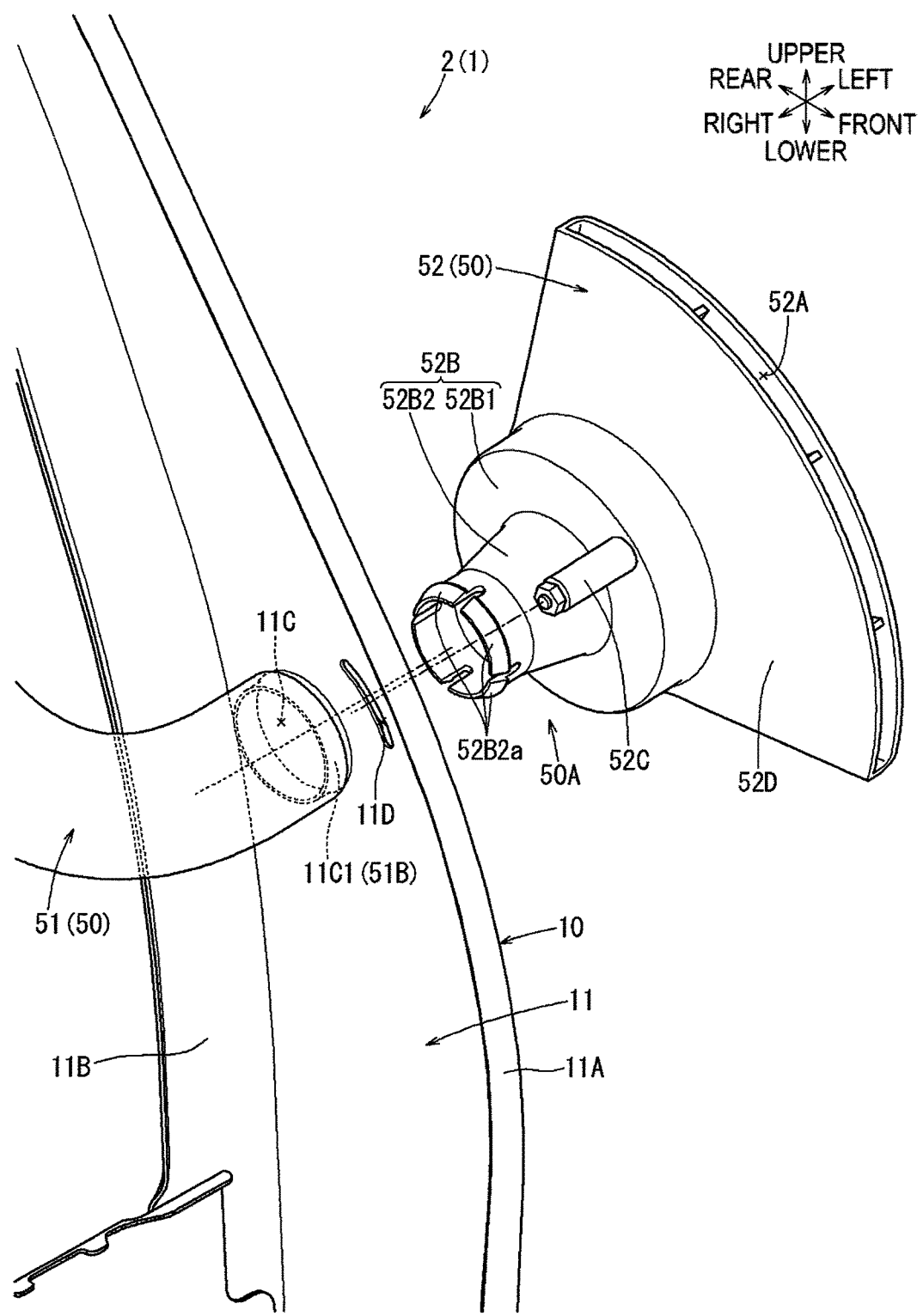
FIG. 3 is a perspective view showing a state where a first divided duct is attached to a seat frame.

Specifically, as shown in FIG. 2, the ducts 50 are divided into a first divided duct 51 which is provided to be connected with the air conditioning apparatus 40 in the seat back 2, and a pair of left and right second divided ducts 52 which is inserted to flow passages of the first divided duct 51, which are branched to the left and right bifurcately, from both left and right outer sides of the seat back 2 and connected with the flow passages. Configurations of these second divided ducts 52 and the connection structure corresponding to these first divided duct 51 are left-right symmetrical with each other. Here, the second divided duct 52 corresponds to the "duct" of the disclosure, and the first divided duct 51 corresponds to the "connection member" of the disclosure.

As shown in FIG. 1, the first divided duct 51 is connected with the air conditioning apparatus 40 at a substantially central portion of the seat back 2 in a seat width direction. Further, flow passages are branched to the left and right bifurcately from the first divided duct 51, and each cylindrical insertion portion 51B which forms a front end of the branched flow passage is inserted into a cylindrical flange portion 11C1, which protrudes along a periphery of each corresponding round-hole-shaped through hole 11C formed in each side frame 11 forming the side framework on the left and right sides of the seat back 2, in a way of fitting to an outer peripheral part of the flange portion 11C 1 from an inner side in the seat width direction, so that the first divided duct 51 is in flow passage connection with the through hole 11C. Here, the side frame 11 described above corresponds to the "seat internal structure" of the disclosure.

Figure 4:
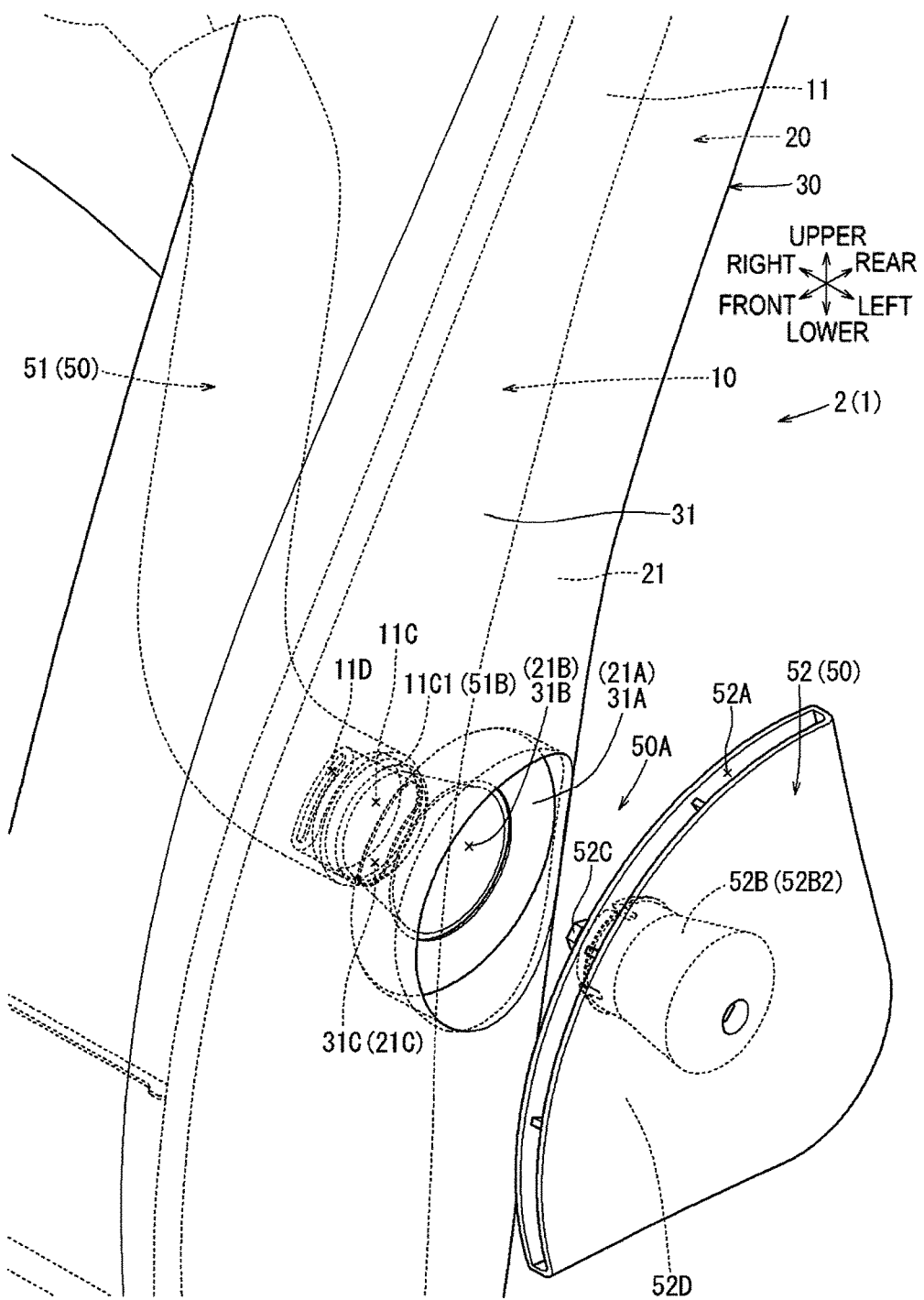
FIG. 4 is an exploded perspective view showing a state before a second divided duct is inserted into a seat back.
Figure 5:
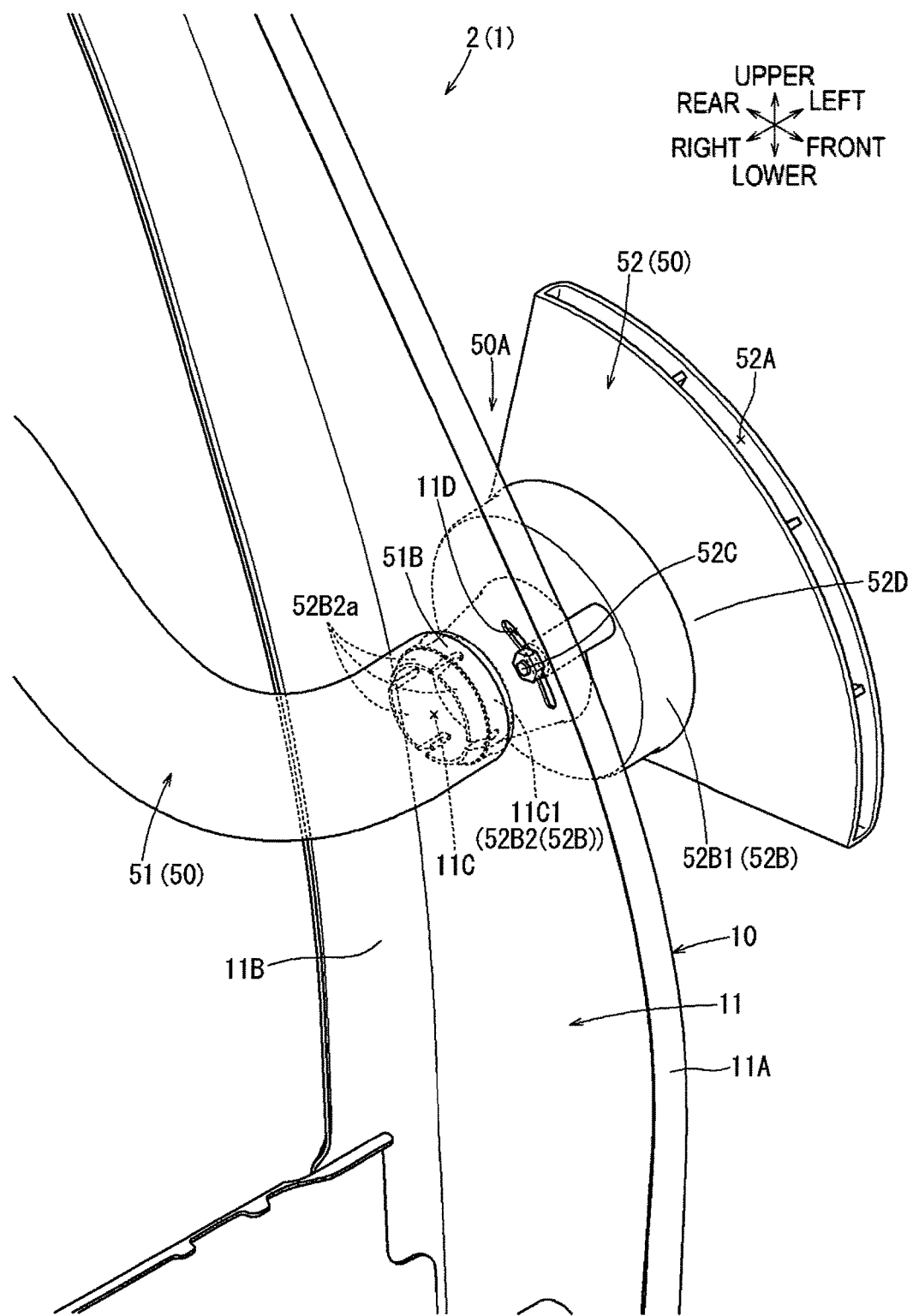
FIG. 5 is a perspective view showing a state where the second divided duct is attached to the seat frame.
Figure 6:
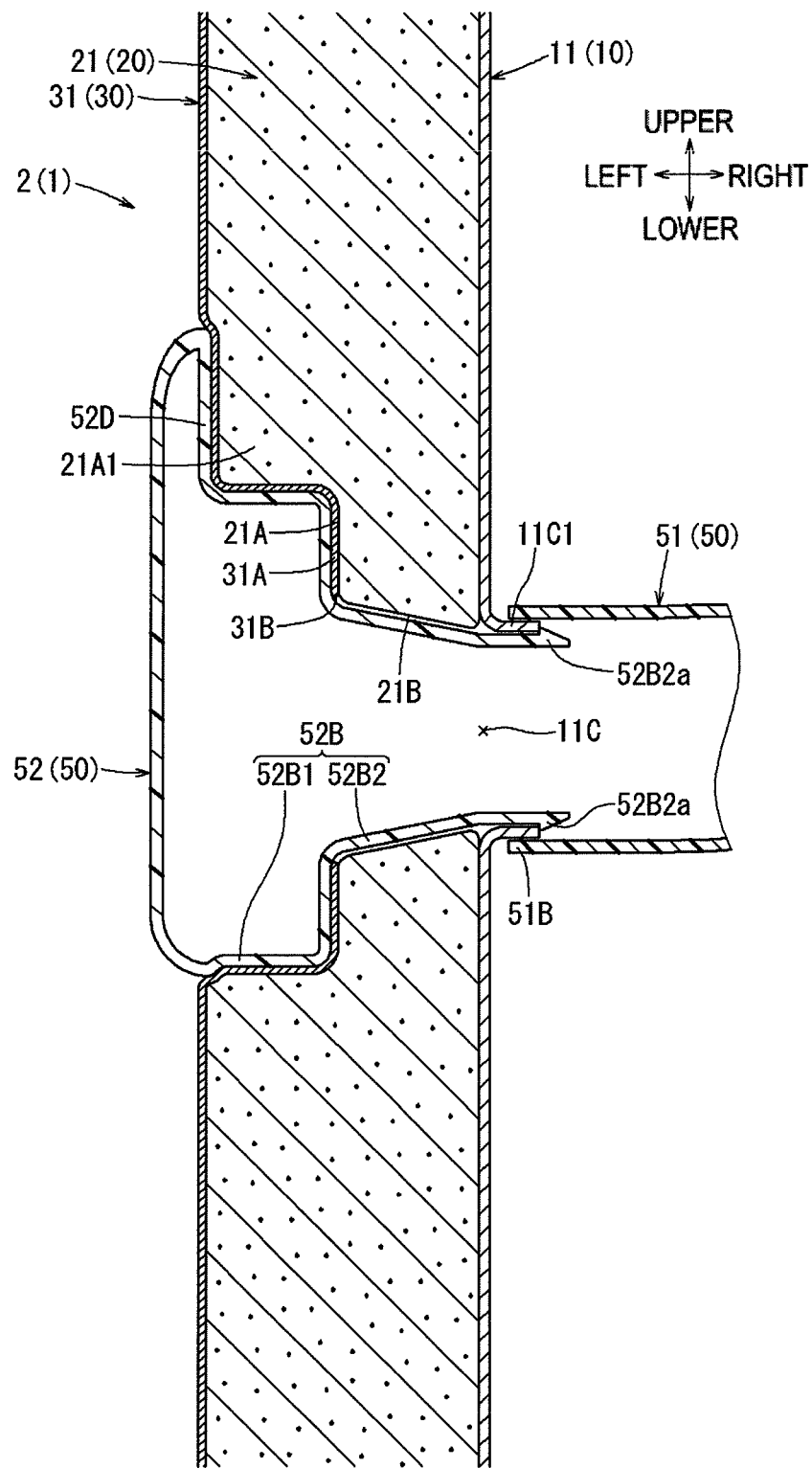
FIG. 6 is a cross sectional view taken along a line VI-VI in FIG. 1.

Meanwhile, as shown in FIG. 1, each of the second divided ducts 52 includes an air outlet 52A which is opened in a vertically elongated shape, and is exposed to the outside of the seat back 2, so that air sent from an inner side of the seat back 2 can be blown frontward. As shown in FIG. 4, a cylindrical insertion portion 52B of each second divided duct 52, which forms upstream-side flow passage that is inserted and connected to each side portion of the seat back 2, is inserted into corresponding insertion holes 31B and 21B, which are formed to penetrate the left and right side portions of the seat back 2, from the outside in the seat width direction, and accordingly the insertion portion 52B is inserted and fitted to each corresponding cylindrical flange portion 11C 1 which is positioned at an insertion front end of the insertion portion 52B and is formed on the side frame 11, as shown in FIGS. 5 to 6.

With the fitting described above, the second divided ducts 52 are connected to the left and right flow passages of the first divided duct 51 via the flange portions 11C 1. Further, with the attachment described above, each second divided duct 52 is supported in a state of being axially rotatable with respect to the side frame 11 around the insertion portion 52B inserted into the through hole 11C with the seat width direction serving as an rotation axis.

Specific Configuration of Seat Back 2

Hereinafter, a specific configuration of each portion in the seat back 2 will be described in detail. First, a basic configuration of the seat back 2 will be described.

As shown in FIG. 2, the seat back 2 is schematically configured by a metal back frame 10 forming a framework thereof, a urethane foam-made back pad 20 which is set to a front portion of the back frame 10 and configured for elastically receiving a backrest load from a seated person, and a fabric back cover 30 covering an entire surface of the back pad 20 and configuring a design surface of the seat back 2. Further, the air conditioning apparatus 40 (air blower) for blowing air used for air conditioning and resin ducts 50 including the air outlets 52A through which air discharged from the air conditioning apparatus 40 can be guided to the left and right side portions of the seat back 2 and blown to a front side of the seat back 2 from the left and right side portions thereof are attached to the back frame 10. Here, the back pad 20 corresponds to the "seat pad" of the disclosure, and the back cover 30 corresponds to the "seat cover" of the disclosure.

Configuration of Back Frame 10

The back frame 10 is assembled in a form of including a pair of left and right vertically elongated side frames 11 which forms the side frameworks on the left and right sides of the seat back 2, an upper pipe 12 which is formed of a round pipe material bent in an inverted U shape and is integrally bridged between upper portions of the side frames 11 to form an upper framework of the seat back 2, and a flat bridging panel 13 which is integrally bridged between the upper portions of the side frames 11.

The side frame 11 is formed in a form of an erected plate whose surface straightly faces the seat width direction and which extends elongatedly in the seat height direction. On each of the side frames 11, a front side flange 11A which is bent and protrudes inwardly in the seat width direction is formed along a front side edge portion of the side frame 11. Also, on edge portions on rear sides of the side frame 11, a rear side flange 11B which is bent and protrudes inwardly in the seat width direction is also formed along the edge portion.

Furthermore, a round-hole-shaped through hole 11C penetrating in the seat width direction (plate thickness direction) is formed in an intermediate portion of the side frame 11 in the seat height direction. On a periphery of the through hole 11C, a flange portion 11C1 which protrudes inwardly in the seat width direction in a cylindrical shape along the periphery is formed by burring processing. Also, at a position away from a front side of the through hole 11C of the side frame 11, an elongated hole 11D which is curved to form a circular arc concentric with the through hole 11C is further formed to penetrate in the seat width direction (plate thickness direction).

Configuration of Back Pad 20

The back pad 20 is set in a state of covering the back frame 10 from a front side thereof. Specifically, the back pad 20 is set in a form of crossing the side frames 11 and the upper pipe 12 which configure the back frame 10 and covering the back frame 10 from the front side thereof, so that the back pad 20 is provided in a state of being supported strongly by the side frames 11 and the upper pipe 12 from a rear side thereof. Also, the back pad 20 is supported by the back frame 10 from the rear side thereof in a substantially planar shape across a wide range in a state where even a central region which is not supported by the side frames 11 and the upper pipe 12 is also supported by a contour mat (not shown) bridged between the back frame 10 from the rear side thereof.

After being set to a front portion of the back frame 10, the back pad 20 is pressed against the back frame 10 and fixed in position by the back cover 30 covering the entire surface of the back pad 20. Specifically, after being set to the front portion of the back frame 10, the back pad 20 is held in a state of being pressed against the back frame 10 from a front side and both left and right sides thereof via the back cover 30 in such a way that upper, lower, right and left peripheral edge portions of the back cover 30 covering the entire surface thereof are drawn backwards to the back frame 10 and fixed to the back frame 10.

A recessed portion 21A which is recessed into a cylindrical shape from an outer side in the seat width direction is formed in each peripheral side portion 21 covering an outside of each side frame 11 of the back pad 20. Further, a round-hole-shaped insertion hole 21B penetrating in the seat width direction is further formed in a center part of each recessed portion 21A concentrically with the recessed portion 21A. Furthermore, at a position away from a front side of the insertion hole 21B in the recessed portion 21A, an elongated hole 21C which is curved to form a circular arc concentric with the insertion hole 21B is formed to penetrate in the seat width direction. In order to expose the through hole 11C and the elongated hole 11D formed in the side frames 11 to the outside in the seat width direction, the insertion hole 21B and the elongated hole 21C are formed in a form of penetrating the through hole 11C and the elongated hole 11D respectively.

Back Cover 30

After the back cover 30 is covered to the back pad 20 from the front side thereof, the upper, lower, left and right peripheral edge portions of the back cover 30 are drawn backwards across an outer peripheral edge of the back pad 20 and fixed to the back frame 10. With the above drawing, the back cover 30 is stretched in a form of being in wide and close contact with the entire surface of the back pad 20.

In left and right peripheral side surface portions 31 of the back cover 30 which cover the left and right peripheral side portions 21 of the back pad 20, recessed cover portions 31A sewn in a form of being recessed in a cylindrical shape inwardly in the seat width direction along the shape of the recessed portions 21A are formed on regions of the side surface portions 31 to be covered to the recessed portions 21A of the back pad 20. Further, in a center part of each recessed cover portion 31A, a round-hole-shaped insertion hole 31B penetrating in the seat width direction is formed concentrically with the recessed cover portion 31A. Furthermore, at a position away from a front side of the insertion hole 31B in the recessed cover portion 31A, an elongated hole 31C which is curved to form a circular arc concentric with the insertion hole 31B is formed to penetrate in the seat width direction.

In order to expose the insertion hole 21B and the elongated hole 21C to the outside in the seat width direction, the insertion hole 31B and the elongated hole 31C are formed in a form of penetrating the insertion holes 21B and the elongated holes 21C formed in peripheral side portions 21 of the back pad 20 respectively. With the above configuration, due to the insertion hole 31B and the elongated hole 31C formed in peripheral side surface portion 31 of the back cover 30, the insertion hole 11C and the elongated hole 11D formed in the side frame 11 are provided in a state of facing the outside in the seat width direction via the insertion hole 21B and the elongated hole 21C formed in peripheral side portion 21 of the back pad 20.

Air Conditioning Apparatus 40 and Duct 50

As shown in FIG. 2, the air conditioning apparatus 40 is assembled and fixed to the bridging panel 13 of the back frame 10 from a rear side thereof. The air conditioning apparatus 40 sends air sucked from an intake port 41 opened in a rear side of the air conditioning apparatus 40 from an exhaust port 42 opened in a lower side of the air conditioning apparatus 40 by rotation of an air blowing fan inside the air conditioning apparatus 40. As also mentioned above, the ducts 50 are divided into the first divided duct 51 which is connected with the air conditioning apparatus 40 and provided in the seat back 2, and the second divided ducts 52 which are inserted and connected to the flow passages of the first divided duct 51 branched to the left and right bifurcately from both left and right outer sides of the seat back 2.

Specifically, the first divided duct 51 includes connection ports 51A which are fitted into the exhaust ports 42 of the air conditioning apparatus 40 from the lower side thereof and in flow passage connection therewith, and the flow passages in front of connection ports 51A are branched to the left and right bifurcately from the connection port 51A. Further, a cylindrical insertion portion 51B which forms a front end of each flow passages branched to the left and right bifurcately are fitted to outer periphery of the flange portion 11C 1 of the corresponding through hole 11C formed in the side frame 11 from an inner side in the seat width direction, and accordingly the first divided duct 51 is attached in a state where the insertion portion 51B is press-fitted with the flange portion 11C1 substantially without any gap.

Next, a configuration of the second divided duct 52 will be described. As shown in FIG. 2, each of the second divided ducts 52 includes an air outlet 52A which is opened in a vertically elongated shape, and is exposed to the outside of the seat back 2 so that the air sent from an inner side of the seat back 2 can be blown frontward. Further, each of the second divided ducts 52 is formed in a stepped cylindrical shape in which a cylindrical insertion portion 52B which is inserted and connected to each side portion of the seat back 2 and forms an upstream-side flow passage has a substantially cylindrical large-diameter portion 52B1 which projects inwardly in the seat width direction and a substantially cylindrical small-diameter portion 52B2 which projects inwardly in the seat width direction from an center part of the large-diameter portion 52B1 in a shape having an outer diameter smaller than that of the large-diameter portion 52B1.

As shown in FIG. 6, each insertion portion 52B is inserted into the seat back 2, so that the large-diameter portion 52B1 of each insertion portion 52B is set in a state of being fitted in the recessed cover portions 31A which is formed in the peripheral side surface portion 31 of the back cover 30 and the recessed portion 21A which is formed in the peripheral side portion 21 of the back pad 20 and covered by the recessed cover portion 31A. Also, the insertion portion 52B is inserted into the seat back 2, and accordingly the small-diameter portion 52B2 of each insertion portion 52B passes the insertion hole 31B formed in the recessed cover portion 31A of the back cover 30 and the insertion hole 21B, which is in communication with the insertion hole 31B and formed in the recessed portion 21A of the back pad 20, and are fitted in the flange portion 11C1 formed on each side frame 11 from an outer side in the seat width direction, and thus the small-diameter portion 52B2 is set in a state of being press-fitted with the flange portion 11C1 substantially without any gap.

Specifically, the small-diameter portion 52B2 of the insertion portion 52B is fitted to the flange portion 11C 1 of the side frame 11 from the outer side in the seat width direction, and accordingly fitting claws 52B2a which have a shape of radially outwardly projecting claw and are formed at a plurality of peripheral positions of the small-diameter portion 52B2 on a front end side thereof get on an inner periphery of each flange portion 11C 1, and after that the fitting claws 52B2a are elastically restored at a front end position where the flange portions 11C1 are pulled inwardly in the seat width direction and are engaged with the flange portions 11C 1 in a state of being caught on front end surfaces of the flange portions 11C 1 on inner side thereof in the seat width direction, so that the small-diameter portion 52B2 is integrally coupled with the flange portion 11C 1 in a state where the small-diameter portion 52B2 does not come off from the flange portion 11C1 outwardly in the seat width direction.

With the above fitting, the insertion portions 52B of the second divided ducts 52 are attached in a state of being in flow passage connection with the left and right insertion portions 51B of the first divided duct 51 via the flange portions 11C 1 of corresponding through holes 11C on the left and right sides of the side frames 11. Further, with the above attachment, the ducts 50 are arranged in a form of extending to penetrate the through holes 11C formed in the side frames 11.

As shown in FIG. 2, with the insertion portion 52B of each second divided duct 52 being inserted into the flange portion 11C1 of the corresponding through hole 11C of the side frame 11, a coupling pin 52C which is attached on the large-diameter portion 52B1 of each second divided duct 52 and protrudes inwardly in the seat width direction is inserted into the elongated hole 11D formed in the side frame 11 after passing through the elongated hole 31C formed in the recessed cover portion 31A of the back cover 30 and the elongated hole 21C which is in communication with the elongated hole 31C and formed in the recessed portion 21A of the back pad 20.

Further, a front end portion of the coupling pin 52C is inserted into the elongated hole 11D of the side frame 11, and accordingly peripheral edges of the elongated hole 11D on the front and rear sides thereof are fitted into grooves recessed in a slit shape and formed on a periphery of a front end portion of the coupling pin 52C, and thus the coupling pin 52C is set in a state where movement in the insertion and withdrawing direction (seat width direction) with respect to the elongated hole 11D is restricted, so that the coupling pin 52C is assembled in a state of being slidable in the elongated hole 11D in an arc shape along an extending direction of the elongated hole 11D.

With the above assembling, the second divided duct 52 is attached to the side frame 11 at two different positions in a seat front-rear direction, and the second divided duct 52 is provided in a state of having a high structural strength that can receive loads from outside by widely dispersing the loads. Specifically, with the assembling described above, each second divided duct 52 is supported in a state of being axially rotatable with respect to the side frame 11 around the small-diameter portion 52B2 of the insertion portion 52B inserted into the through hole 11C of the side frame 11 with the seat width direction serving as an axis.

More specifically, each coupling pin 52C extending from the large-diameter portion 52B1 of the second divided duct 52 can slide along the elongated hole 11D of the side frame 11, and accordingly the second divided duct 52 is axially rotatable around the small-diameter portion 52B2 of the insertion portion 52B. With the above rotation, each second divided duct 52 can adjust a direction of the air outlet 52A opened towards a seat front side in a seat height direction, as shown in FIG. 1. The rotatable moving range of the second divided duct 52 is defined in a range that the coupling pin 52C shown in FIG. 2 can move in the elongated hole 11D.

In a state where a rotation angle of the second divided duct 52 is adjusted to any position, the large-diameter portion 52B1 of the second divided duct 52 is held in a state where the rotation is stopped under the action of repulsive force received from an inner peripheral part (repulsive portion 21A1 in FIG. 6) of the recessed portion 21A of the back pad 20 via the recessed cover portion 31A of the back cover 30. However, each second divided duct 52 can easily adjust a direction of the air outlet 52A opened towards the seat front side in the seat height direction through an operation in which a part of the second divided duct 52 exposed to the outside of the seat back 2 is gripped by a user such as a seated person and rotated in the seat height direction against the action of the repulsive force received from the repulsive portion 21A1 of the back pad 20.

In this case, the large-diameter portion 52B1 receives the repulsive force from the repulsive portion 21A1 of the back pad 20 via the recessed cover portion 31A of the back cover 30 without directly contacting with the repulsive portion 21A1 of the back pad 20, and thus the second divided duct 52 adjusts the direction of the air outlet 52A with good operability while smoothly sliding on the recessed cover portion 31A of the back cover 30. With such a configuration, the rotation mechanism 50A is configured.

Also, each second divided duct 52 is attached to the side frame 11, and thus a holding portion 52D which projects in a flange shape and formed on an outer peripheral part of the second divided duct 52 that protrudes outside the seat back 2 is set in a state of being abutted against the peripheral edge of the recessed cover portion 31A of each peripheral side surface portion 31 of the back cover 30 from the outer side in the seat width direction. Therefore, each second divided duct 52 is in a state where the peripheral edge of the recessed cover portion 31A of the back cover 30 is elastically pushed and sandwiched between the holding portion 52D and the peripheral edge of the recessed portion 21A of the peripheral side portion 21 of the back pad 20, so that a recess of the recessed cover portion 31A of the back cover 30 is covered with good appearance in a state of being invisible from the exterior.

SUMMARY

In summary, the seat 1 of the present embodiment has the following configurations. That is, a vehicle seat (seat 1) includes a seat cover (back cover 30) configuring a design surface of a seat peripheral surface portion, a seat pad (back pad 20) covered by the seat cover (back cover 30) and configured to elastically support a load from a seated person, an air conditioning duct (second divided duct 52) protruding from the seat peripheral surface portion, an insertion hole (insertion holes 31B and 21B) penetrating the seat cover (back cover 30) and the seat pad (back pad 20), and a connection member (first divided duct 51) attached to a seat internal structure (side frame 11) which is provided at one side of the insertion hole (insertion holes 31B and 21B) opposite to another side of the insertion hole (insertion holes 31B and 21B) from which the duct (second divided duct 52) is inserted into the insertion hole (insertion holes 31B and 21B). The duct (second divided duct 52) is attached to the seat internal structure (side frame 11) in a state of being inserted into the insertion hole (insertion holes 31B and 21B) and connected with the connection member (first divided duct 51).

Therefore, since the air conditioning duct (second divided duct 52) provided to the seat peripheral surface portion is inserted into the insertion hole formed in the seat pad (back pad 20) and the seat cover (back cover 30) which configures the seat peripheral surface portion and connected with the connection member (first divided duct 51), it is possible to arrange the duct (second divided duct 52) compactly without detouring around the seat peripheral surface portion.

Also, the duct (second divided duct 52) includes a holding portion (holding portion 52D) that holds a portion (recessed cover portion 31A) of the seat cover (back cover 30) surrounding the insertion hole (insertion hole 31B and 21B) in a state where the portion (recessed cover portion 31A) of the seat cover (back cover 30) surrounding the insertion hole (insertion hole 31B and 21B) is elastically pushed and sandwiched between the holding portion (holding portion 52D) and a portion (recessed portion 21A) of the seat pad (back pad 20) surrounding the insertion hole (insertion hole 21B), in a case where the duct (second divided duct 52) is attached to the seat internal structure (side frame 11).

With such a configuration, it is possible to cover and hide the portion (recessed cover portion 31A) of the seat cover (back cover 30) surrounding the insertion hole (insertion hole 31B and 21B) with good appearance when seen from the exterior by attaching the duct (the second divided duct 52) to the seat internal structure (the side frame 11).

Furthermore, the seat 1 further includes a rotation mechanism (rotation mechanism 50A) configured to attach the duct (second divided duct 52) to the seat internal structure (side frame 11) to be axially rotatable around an axis extending in the insertion direction (seat width direction), the insertion direction (seat width direction) being a direction in which the duct (second divided duct 52) is inserted into the insertion hole (insertion hole 31B and 21B).

With such a configuration, it is possible to adjust a direction of the air outlet (air outlet 52A) or intake port provided to the duct (second divided duct 52) in a direction along the seat peripheral surface portion (seat height direction) by rotating the duct (second divided duct 52) through the rotation mechanism (rotation mechanism 50A).

Also, a portion (recessed portion 21A) of the seat pad (back pad 20) surrounding the insertion hole (insertion hole 21B) is a repulsive portion (repulsive portion 21A1) configured to apply repulsive force to the duct (second divided duct 52), thereby applying sliding frictional resistance force, in a rotation direction of the duct (second divided duct 52), to the duct (second divided duct 52).

With such a configuration, it is possible to hold the duct (second divided duct 52) appropriately in position by utilizing the elastic structure of the seat pad (back pad 20) in which the duct (second divided duct 52) is inserted.

Other Embodiments

Modes for carrying out the disclosure has been described with one embodiment, but the disclosure can be carried out in various modes other than the above embodiment. For example, the vehicle seat of the disclosure can be applied to not only a seat other than a right seat of an automobile, but also to seats for cars other than automobiles such as trains, and seats provided for other vehicles such as aircraft and ships. In addition to the seat back, the configuration of the disclosure can be applied to other seat structures such as seat cushions, ottomans, armrests.

Specifically, in addition to side portions of the seat back, the configuration of the disclosure can also be applied to other seat peripheral surface portions thereof, such as upper portions and shoulder portions thereof. Also, in addition to side portions of a seat cushion, the configuration of the disclosure can also be applied to other seat peripheral surface portions thereof, such as front portions and rear portions thereof. Also, in addition to side portions of an ottoman, the configuration of the disclosure can also be applied to other seat peripheral surface portions thereof such as front portions thereof. Also, in addition to side portions of an armrest, the configuration of the disclosure can also be applied to other seat peripheral surface portions thereof such as front portions and rear portions thereof.

Also, the seat cover forming the design surface of the seat peripheral surface portion may be made of a material other than a fabric, such as leather. The insertion holes which are formed to penetrate the seat cover and the seat pad may be formed in another different shape such as a regular circle shape, or a polygonal shape. The seat internal structure to which the connection member is attached may be made of seat accessories, such as various brackets and electrical components, besides a seat frame such as a side frame. In addition to a duct inserted from the outside of the seat and the other duct connected to the flow passage, the connection member may be a connection port of an air conditioning apparatus.

Also, the duct may be made of metal besides resin. The duct may have a structure in which a flow passage connected to the connection member is branched into a plurality of flow passages and inserted into the seat from individual insertion holes so as to be connected to the connection member. The shape of the duct and the insertion hole through which the duct is inserted is not limited to a round hole shape, and may be another irregular shape such as a polygonal shape. Also, the insertion hole of the seat pad formed to penetrate a part of the recessed portion has been exemplified in the above embodiment, but the insertion hole may be formed to penetrate a general surface other than the recessed portion. In this case, the inner peripheral part of the insertion hole can function as a repulsive portion for applying sliding frictional resistance force in a rotation direction to the duct accompanying with the repulsive force.

The repulsive portion, which is configured by a portion of the seat pad surrounding the insertion hole and configured to apply repulsive force to the duct, thereby applying sliding frictional resistance force, in a rotation direction of the duct, to the duct, may be configured by a portion other than the inner peripheral part of the insertion hole. For example, the repulsive portion may be configured by a portion of the seat pad on a periphery of the duct whose surface faces a side from which the duct is inserted into the through hole. That is, the repulsive portion may apply the repulsive force to the duct from the outer side in a radial direction, or may apply the repulsive force in an axial direction.

What is claimed is:

1. A vehicle seat comprising:
   a seat cover configuring a design surface of a seat peripheral surface portion;
   a seat pad covered by the seat cover and configured to elastically support a load from a seated person;
   an air conditioning duct protruding from the seat peripheral surface portion;
   an insertion hole penetrating the seat cover and the seat pad; and
   a connection member attached to a seat internal structure which is provided at one side of the insertion hole opposite to another side of the insertion hole from which the duct is inserted into the insertion hole,
   wherein the duct is attached to the seat internal structure from an outer side of the vehicle seat, and wherein the duct is attached to the seat internal structure in a state of being inserted into the insertion hole and connected with the connection member.

2. The vehicle seat according to claim 1,
   wherein the duct includes a holding portion that holds a portion of the seat cover surrounding the insertion hole in a state where the portion of the seat cover surrounding the insertion hole is elastically pushed and sandwiched between the holding portion and a portion of the seat pad surrounding the insertion hole, in a case where the duct is attached to the seat internal structure.

3. The vehicle seat according to claim 1, further comprising: a rotation mechanism configured to attach the duct to the seat internal structure to be axially rotatable around an axis extending in an insertion direction, the insertion direction being a direction in which the duct is inserted into the insertion hole.

4. The vehicle seat according to claim 3, wherein a portion of the seat pad surrounding the insertion hole is a repulsive portion configured to apply repulsive force to the duct, thereby applying sliding frictional resistance force, in a rotation direction of the duct, to the duct.

* * * * *